(12) United States Patent
Ma et al.

(10) Patent No.: US 10,383,139 B2
(45) Date of Patent: Aug. 13, 2019

(54) DEVICE AND METHOD FOR DATA TRANSMISSION IN $D_2D$ COMMUNICATION

(71) Applicant: Huawei Technologies Co., Ltd., Shenzhen (CN)

(72) Inventors: Jie Ma, Beijing (CN); Deping Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/272,226

(22) Filed: Sep. 21, 2016

(65) Prior Publication Data

US 2017/0013639 A1 Jan. 12, 2017

Related U.S. Application Data

(63) Continuation of application No. PCT/CN2014/073897, filed on Mar. 21, 2014.

(51) Int. Cl.
*H04W 72/00* (2009.01)
*H04W 72/12* (2009.01)
*H04W 72/02* (2009.01)
*H04L 1/18* (2006.01)
(Continued)

(52) U.S. Cl.
CPC ....... *H04W 72/1278* (2013.01); *H04L 1/1822* (2013.01); *H04L 1/1887* (2013.01); *H04W 72/02* (2013.01); *H04W 72/0453* (2013.01); *H04W 92/18* (2013.01)

(58) Field of Classification Search
None
See application file for complete search history.

(56) References Cited

U.S. PATENT DOCUMENTS

2008/0227449 A1* 9/2008 Gholmieh ........... H04W 68/025
455/434
2010/0182973 A1 7/2010 Kim et al.
2011/0106952 A1 5/2011 Doppler et al.
(Continued)

FOREIGN PATENT DOCUMENTS

CN 102090132 A 6/2011
CN 103002456 A 3/2013
(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 12), 3GPP TS 36.212, V12.0.0, Dec. 2013, 88 pages.
(Continued)

*Primary Examiner* — Brandon M Renner
(74) *Attorney, Agent, or Firm* — Slater Matsil, LLP

(57) ABSTRACT

A method includes: transmitting, by a transmitting user equipment (UE), scheduling signaling to a receiving UE, where the scheduling signaling includes frequency domain resource information, a quantity of cycles that can be occupied, or transmission pattern information. The method further includes transmitting, by the transmitting UE, user data to the receiving UE according to the scheduling signaling, so that the receiving UE receives the user data according to the scheduling signaling.

20 Claims, 6 Drawing Sheets

(51) Int. Cl.
*H04W 72/04* (2009.01)
*H04W 92/18* (2009.01)

(56) References Cited

U.S. PATENT DOCUMENTS

| | | | |
|---|---|---|---|
| 2012/0195250 A1 | 8/2012 | Jani et al. | |
| 2013/0028200 A1* | 1/2013 | Nory | H04W 72/02 370/329 |
| 2013/0089020 A1* | 4/2013 | Hakola | H04L 1/1867 370/312 |
| 2013/0142098 A1* | 6/2013 | Kwon | H04W 52/04 370/311 |
| 2014/0010175 A1 | 1/2014 | Chiu | |
| 2014/0036718 A1* | 2/2014 | Gao | H04W 72/121 370/254 |
| 2014/0342747 A1 | 11/2014 | Lee et al. | |
| 2015/0016410 A1 | 1/2015 | Lee et al. | |
| 2015/0063247 A1* | 3/2015 | Lee | H04W 72/042 370/329 |
| 2015/0124646 A1* | 5/2015 | Yun | H04W 4/06 370/254 |
| 2015/0195824 A1* | 7/2015 | Choi | H04L 5/0053 370/236 |
| 2015/0289165 A1* | 10/2015 | Reider | H04W 28/0289 370/236 |
| 2016/0007371 A1* | 1/2016 | Pietraski | H04W 72/1263 370/315 |
| 2016/0037549 A1* | 2/2016 | Seo | H04W 76/14 370/329 |
| 2016/0037570 A1 | 2/2016 | Guo | |
| 2016/0183276 A1* | 6/2016 | Marinier | H04W 72/02 370/329 |

FOREIGN PATENT DOCUMENTS

| | | |
|---|---|---|
| CN | 103002594 A | 3/2013 |
| CN | 103238306 A | 8/2013 |
| CN | 103339892 A | 10/2013 |
| CN | 103368706 A | 10/2013 |
| CN | 103546254 A | 1/2014 |
| CN | 103874048 A | 6/2014 |
| EP | 2683207 A1 | 1/2014 |
| WO | 2013109100 A1 | 7/2013 |
| WO | 2013122384 A1 | 8/2013 |
| WO | 2013167078 A2 | 11/2013 |

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213, V12.1.0, Mar. 2014, 186 pages.

Ericsson, "D2D Scheduling Procedure," 3GPP TSG-RAN WG2 #84, Tdoc R2-134238, San Francisco, USA, Nov. 11-15, 2013, 7 pages.

LG Electronics, "Discussion on Resource Allocation in D2D Communications," 3GPP TSG RAN WG1 Meeting #75, R1-135481, Nov. 11-15, 2013, San Francisco, USA, 15 pages.

Qualcomm Inc., "D2D broadcast resource allocation and interference management algorithms," 3GPP TSG-RAN WG1 #75, R1-135322, Nov. 11-15, 2013, San Francisco, USA, 15 pages.

ZTE, "Physical channel design for D2D communication," 3GPP TSG RAN WG1 Meeting #76, R1-140270, Feb. 10-14, 2014, Prague, Czech Republic, 3 pages.

* cited by examiner

DEVICE AND METHOD FOR DATA TRANSMISSION IN $D_2D$ COMMUNICATION

CROSS-REFERENCE TO RELATED APPLICATIONS

This application is a continuation of International Application No. PCT/CN2014/073897, filed on Mar. 21, 2014, the disclosure of which is hereby incorporated by reference in its entirety.

TECHNICAL FIELD

Embodiments relate to communications technologies, and in particular embodiments, to a device and a method for data transmission in device-to-device (D2D) communication.

BACKGROUND

If wireless communication coverage is relatively good, both an operator and a government wish that some public safety events could be handled by wireless communication. After a safety event occurs, an emergency commanding team and a rescue team perform communication in a geographic area. Each team member holds a special terminal. This special terminal is referred to as a device-to-device (D2D) communications device or a cellular D2D communications terminal device. That is, like an ordinary wireless terminal, this terminal can perform cellular communication with a base station, and can also directly communicate with another cellular D2D communications terminal device. Due to blocking of a terrain and a time-varying feature of radio signals, there is actually a cell coverage hole. In public safety requirements, it is required that a cellular D2D communications terminal can be applied within network coverage and without network coverage. Generally, public safety personnel are multiple persons that are grouped or clustered to take actions.

In conventional long term evolution (LTE) system, an asynchronous hybrid automatic repeat request (HARQ) mode is used for transmitting downlink data, and a synchronous HARQ mode is used for transmitting uplink data.

However, if an LTE HARQ mode is used in D2D communication, because there is no feedback channel between transmitting user equipment (UE) and receiving UE, the LTE retransmission mode cannot be used to ensure reliability of data transmission.

SUMMARY

Embodiments provide a device and a method for data transmission in D2D communication, which are used to implement reliable data transmission in D2D communication.

A first aspect provides a transmitting user equipment, including a transmission module, configured to transmit scheduling signaling to a receiving user equipment (UE), where the scheduling signaling includes at least one of frequency domain resource information, a quantity of cycles that can be occupied, or transmission pattern information. The transmitting UE further includes a processing module, configured to transmit user data to the receiving UE according to the scheduling signaling, so that the receiving UE receives the user data according to the scheduling signaling.

In a first possible implementation manner of the first aspect, the scheduling signaling further includes a quantity of repetitions of a data packet. The processing module is configured to repeatedly transmit the user data to the receiving UE according to the scheduling signaling, according to a transmission pattern indicated by the transmission pattern information, and according to the quantity of repetitions of the data packet, in a frequency domain position indicated by the frequency domain resource information, in a transmission subframe indicated by the quantity of cycles that can be occupied.

According to the first possible implementation manner of the first aspect, in a second possible implementation manner of the first aspect, the processing module is further configured to control an automatic repeat request HARQ process of the transmitting UE to: obtain a first PDU in a medium access control packet data unit MAC PDU buffer, and record a quantity of times of transmission as 0; and if the HARQ process determines, according to an identifier of the HARQ process and the transmission pattern, that a transmission subframe of the first PDU arrives, transmit the first PDU to the receiving UE by using the transmission subframe of the first PDU, and add 1 to the quantity of times of transmission, until the quantity of times of transmission reaches the quantity of repetitions of the data packet.

According to the second possible implementation manner of the first aspect, in a third possible implementation manner of the first aspect, if a resource corresponding to the HARQ process is allocated to another transmitting UE for use, the processing module stops using the HARQ process after the quantity of times of transmission reaches the quantity of repetitions of the data packet.

According to the first possible implementation manner of the first aspect, in a fourth possible implementation manner of the first aspect, the processing module is further configured to control a MAC PDU buffer of the transmitting UE to: transmit a second PDU to an HARQ process of the transmitting UE, and record a quantity of times of transmission as 1, so that when the HARQ process determines that a transmission subframe of the second PDU arrives, the HARQ process transmits the second PDU to the receiving UE by using the transmission subframe of the second PDU; and when the MAC PDU buffer determines, according to the transmission pattern, that a minimum repetition interval expires, transmit the second PDU to the HARQ process again, until the quantity of times of transmission reaches the quantity of repetitions of the data packet, where the second PDU includes an identifier of the transmitting HARQ process.

According to the first aspect, in a fifth possible implementation manner of the first aspect, the scheduling signaling further includes an indication that a data packet is new data, where the indication that the data packet is new data is used to indicate that the user data to be transmitted by the transmitting UE is new data.

With reference to the first aspect or any one of the first to fifth possible implementation manners of the first aspect, in a sixth possible implementation manner of the first aspect, the scheduling signaling further includes identifier information of the transmitting UE, where the identifier information is used to indicate a priority of using a frequency domain resource by the transmitting UE.

With reference to the first aspect or any one of the first to sixth possible implementation manners of the first aspect, in a seventh possible implementation manner of the first aspect, the scheduling signaling further includes a service type of the user data to be transmitted by the transmitting UE.

With reference to the first aspect or any one of the first to seventh possible implementation manners of the first aspect, in an eighth possible implementation manner of the first aspect, the processing module is further configured to: 83028914US0 before the transmission module transmits the scheduling signaling to the receiving UE, generate the scheduling signaling; or before the transmission module transmits the scheduling signaling to the receiving UE, receive the scheduling signaling transmitted by a base station.

A second aspect provides receiving user equipment, including a receiving module, configured to receive scheduling signaling transmitted by transmitting user equipment (UE), where the scheduling signaling includes at least one of frequency domain resource information, a quantity of cycles that can be occupied, or transmission pattern information. The receiving UE further includes a processing module, configured to receive, according to the scheduling signaling received by the receiving module, user data transmitted by the transmitting UE.

In a first possible implementation manner of the second aspect, the scheduling signaling further includes a quantity of repetitions of a data packet. The processing module is configured to repeatedly receive, according to the scheduling signaling received by the receiving module, according to a transmission pattern indicated by the transmission pattern information, and according to the quantity of repetitions of the data packet, in a frequency domain position indicated by the frequency domain resource information, in a transmission subframe indicated by the quantity of cycles that can be occupied, the user data repeatedly transmitted by the transmitting UE.

According to the first possible implementation manner of the second aspect, in a second possible implementation manner of the second aspect, the processing module is further configured to transmit, according to the transmission pattern information, first user data in a first subframe in a first frame to a second automatic repeat request HARQ process corresponding to the first subframe, and transmit, according to the transmission pattern information, second user data in a second subframe in a second frame to a third HARQ process corresponding to the second subframe.

According to the second aspect, in a third possible implementation manner of the second aspect, the scheduling signaling further includes an indication that a data packet is new data, where the indication that the data packet is new data is used to indicate that the user data to be transmitted by the transmitting UE is new data. The processing module is further configured to receive, according to the scheduling signaling received by the receiving module and according to a transmission pattern indicated by the transmission pattern information, in a frequency domain position indicated by the frequency domain resource information, in a transmission subframe indicated by the quantity of cycles that can be occupied, the new user data transmitted by the transmitting UE.

With reference to the second aspect or any one of the first to third possible implementation manners of the second aspect, in a fourth possible implementation manner of the second aspect, the scheduling signaling further includes a service type of the user data to be transmitted by the transmitting UE. The processing module is further configured to create, according to the service type, a radio link control (RLC) entity corresponding to the service type; and configure parameters of the RLC entity according to a configuration table t prestored in the receiving UE and corresponds to the service type.

A third aspect provides transmitting user equipment, including a transmitter, a receiver, a memory, and a processor that is connected to the transmitter, the receiver, and the memory, where the transmitter is configured to transmit scheduling signaling to receiving user equipment (UE), where the scheduling signaling includes at least one of frequency domain resource information, a quantity of cycles that can be occupied, or transmission pattern information. Furthermore, the processor is configured to transmit user data to the receiving UE according to the scheduling signaling, so that the receiving UE receives the user data according to the scheduling signaling.

In a first possible implementation manner of the third aspect, the scheduling signaling further includes a quantity of repetitions of a data packet. The processor is configured to repeatedly transmit the user data to the receiving UE according to the scheduling signaling, according to a transmission pattern indicated by the transmission pattern information, and according to the quantity of repetitions of the data packet, in a frequency domain position indicated by the frequency domain resource information, in a transmission subframe indicated by the quantity of cycles that can be occupied.

According to the first possible implementation manner of the third aspect, in a second possible implementation manner of the third aspect, the processor is further configured to control an automatic repeat request HARQ process of the transmitting UE to: obtain a first PDU in a medium access control packet data unit MAC PDU buffer, and record a quantity of times of transmission as 0; and if the HARQ process determines, according to an identifier of the HARQ process and the transmission pattern, that a transmission subframe of the first PDU arrives, transmit the first PDU to the receiving UE by using the transmission subframe of the first PDU, and add 1 to the quantity of times of transmission, until the quantity of times of transmission reaches the quantity of repetitions of the data packet.

According to the second possible implementation manner of the third aspect, in a third possible implementation manner of the third aspect, if a resource corresponding to the HARQ process is allocated to another transmitting UE for use, the processor stops using the HARQ process after the quantity of times of transmission reaches the quantity of times of repeated transmission of the data packet.

According to the first possible implementation manner of the third aspect, in a fourth possible implementation manner of the third aspect, the processor is further configured to control a MAC PDU buffer of the transmitting UE to: transmit a second PDU to an HARQ process of the transmitting UE, and record a quantity of times of transmission as 1, so that when the HARQ process determines that a transmission subframe of the second PDU arrives, the HARQ process transmits the second PDU to the receiving UE by using the transmission subframe of the second PDU; and when the MAC PDU buffer determines, according to the transmission pattern, that a minimum repetition interval expires, transmit the second PDU to the HARQ process again, until the quantity of times of transmission reaches the quantity of repetitions of the data packet, where the second PDU includes an identifier of the transmitting HARQ process.

According to the third aspect, in a fifth possible implementation manner of the third aspect, the scheduling signaling further includes an indication that a data packet is new data, where the indication that the data packet is new data is used to indicate that the user data to be transmitted by the transmitting UE is new data.

With reference to the third aspect or any one of the first to fifth possible implementation manners of the third aspect, in a sixth possible implementation manner of the third aspect, the scheduling signaling further includes identifier information of the transmitting UE, where the identifier information is used to indicate a priority of using a frequency domain resource by the transmitting UE.

With reference to the third aspect or any one of the first to sixth possible implementation manners of the third aspect, in a seventh possible implementation manner of the third aspect, the scheduling signaling further includes a service type of the user data to be transmitted by the transmitting UE.

With reference to the third aspect or any one of the first to seventh possible implementation manners of the third aspect, in an eighth possible implementation manner of the third aspect, the processor is further configured to: before the transmitter transmits the scheduling signaling to the receiving UE, generate the scheduling signaling; or before the transmitter transmits the scheduling signaling to the receiving UE, receive the scheduling signaling transmitted by a base station.

A fourth aspect provides receiving user equipment, including a transmitter, a receiver, a memory, and a processor that is connected to the transmitter, the receiver, and the memory, where the receiver is configured to receive scheduling signaling transmitted by transmitting user equipment (UE), where the scheduling signaling includes at least one of frequency domain resource information, a quantity of cycles that can be occupied, or transmission pattern information. Furthermore, the processor is configured to receive, according to the scheduling signaling received by the receiver, user data transmitted by the transmitting UE.

In a first possible implementation manner of the fourth aspect, the scheduling signaling further includes a quantity of repetitions of a data packet. The processor is configured to repeatedly receive, according to the scheduling signaling received by the receiver, according to a transmission pattern indicated by the transmission pattern information, and according to the quantity of repetitions of the data packet, in a frequency domain position indicated by the frequency domain resource information, in a transmission subframe indicated by the quantity of cycles that can be occupied, the user data repeatedly transmitted by the transmitting UE.

According to the first possible implementation manner of the fourth aspect, in a second possible implementation manner of the fourth aspect, the processor is further configured to transmit, according to the transmission pattern information, first user data in a first subframe in a first frame to a second automatic repeat request HARQ process corresponding to the first subframe, and transmit, according to the transmission pattern information, second user data in a second subframe in a second frame to a third HARQ process corresponding to the second subframe.

According to the fourth aspect, in a third possible implementation manner of the fourth aspect, the scheduling signaling further includes an indication that a data packet is new data, where the indication that the data packet is new data is used to indicate that the user data to be transmitted by the transmitting UE is new data. The processor is further configured to receive, according to the scheduling signaling received by the receiver and according to a transmission pattern indicated by the transmission pattern information, in a frequency domain position indicated by the frequency domain resource information, in a transmission subframe indicated by the quantity of cycles that can be occupied, the new user data transmitted by the transmitting UE.

With reference to the fourth aspect or any one of the first to third possible implementation manners of the fourth aspect, in a fourth possible implementation manner of the fourth aspect, the scheduling signaling further includes a service type of the user data to be transmitted by the transmitting UE. The processor is further configured to create, according to the service type, a radio link control (RLC) entity corresponding to the service type; and configure parameters of the RLC entity according to a configuration table prestored in the receiving UE and corresponds to the service type.

A fifth aspect provides a method for data transmission in D2D communication, where the method includes transmitting, by transmitting user equipment (UE), scheduling signaling to receiving UE, where the scheduling signaling includes at least one of frequency domain resource information, a quantity of cycles that can be occupied, or transmission pattern information. The method further includes transmitting, by the transmitting UE, user data to the receiving UE according to the scheduling signaling, so that the receiving UE receives the user data according to the scheduling signaling.

In a first possible implementation manner of the fifth aspect, the scheduling signaling further includes a quantity of repetitions of a data packet. The transmitting, by the transmitting UE, user data to the receiving UE according to the scheduling signaling, includes: repeatedly transmitting, by the transmitting UE, the user data to the receiving UE according to the scheduling signaling, according to a transmission pattern indicated by the transmission pattern information, and according to the quantity of repetitions of the data packet, in a frequency domain position indicated by the frequency domain resource information, in a transmission subframe indicated by the quantity of cycles that can be occupied.

According to the first possible implementation manner of the fifth aspect, in a second possible implementation manner of the fifth aspect, the repeatedly transmitting, by the transmitting UE, the user data to the receiving UE according to the scheduling signaling, according to a transmission pattern indicated by the transmission pattern information, and according to the quantity of repetitions of the data packet, in a frequency domain position indicated by the frequency domain resource information, in a transmission subframe indicated by the quantity of cycles that can be occupied, includes obtaining, by an automatic repeat request HARQ process of the transmitting UE, a first PDU in a medium access control packet data unit MAC PDU buffer, and recording a quantity of times of transmission as 0. The repeatedly transmitting includes transmitting the first PDU to the receiving UE by using the transmission subframe of the first PDU, and adding 1 to the quantity of times of transmission, until the quantity of times of transmission reaches the quantity of repetitions of the data packet in response to the HARQ process of the transmitting UE determining, according to an identifier of the HARQ process and the transmission pattern, that a transmission subframe of the first PDU arrives.

According to the second possible implementation manner of the fifth aspect, in a third possible implementation manner of the fifth aspect, if a resource corresponding to the HARQ process is allocated to another transmitting UE for use, the transmitting UE stops using the HARQ process after the quantity of times of transmission reaches the quantity of repetitions of the data packet.

According to the first possible implementation manner of the fifth aspect, in a fourth possible implementation manner of the fifth aspect, the repeatedly transmitting, by the transmitting UE, the user data to the receiving UE according to the scheduling signaling, according to a transmission pattern indicated by the transmission pattern information, and according to the quantity of repetitions of the data packet, in a frequency domain position indicated by the frequency domain resource information, in a transmission subframe indicated by the quantity of cycles that can be occupied, includes transmitting, by a MAC PDU buffer of the transmitting UE, a second PDU to an HARQ process of the transmitting UE, and recording a quantity of times of transmission as 1, so that when the HARQ process determines that a transmission subframe of the second PDU arrives, the HARQ process transmits the second PDU to the receiving UE by using the transmission subframe of the second PDU. The repeatedly transmitting includes transmitting the second PDU to the HARQ process again, until the quantity of times of transmission reaches the quantity of repetitions of the data packet, where the second PDU includes an identifier of the transmitting HARQ process, in response to the MAC PDU buffer of the transmitting UE determining, according to the transmission pattern, that a minimum repetition interval expires.

According to the fifth aspect, in a fifth possible implementation manner of the fifth aspect, the scheduling signaling further includes an indication that a data packet is new data, where the indication that the data packet is new data is used to indicate that the user data to be transmitted by the transmitting UE is new data.

With reference to the fifth aspect or any one of the first to fifth possible implementation manners of the fifth aspect, in a sixth possible implementation manner of the fifth aspect, the scheduling signaling further includes identifier information of the transmitting UE, where the identifier information is used to indicate a priority of using a frequency domain resource by the transmitting UE.

With reference to the fifth aspect or any one of the first to sixth possible implementation manners of the fifth aspect, in a seventh possible implementation manner of the fifth aspect, the scheduling signaling further includes a service type of the user data to be transmitted by the transmitting UE.

With reference to the fifth aspect or any one of the first to seventh possible implementation manners of the fifth aspect, in an eighth possible implementation manner of the fifth aspect, before the transmitting, by the transmitting UE, scheduling signaling to receiving UE, the method further includes generating, by the transmitting UE, the scheduling signaling; or receiving, by the transmitting UE, the scheduling signaling transmitted by a base station.

A sixth aspect provides a method for data transmission in D2D communication, where the method includes receiving, by receiving user equipment (UE), scheduling signaling transmitted by transmitting UE, where the scheduling signaling includes at least one of frequency domain resource information, a quantity of cycles that can be occupied, or transmission pattern information; and receiving, by the receiving UE according to the scheduling signaling, user data transmitted by the transmitting UE.

In a first possible implementation manner of the sixth aspect, the scheduling signaling further includes a quantity of repetitions of a data packet. The receiving, by the receiving UE according to the scheduling signaling, user data transmitted by the transmitting UE, includes repeatedly receiving, by the receiving UE according to the scheduling signaling, according to a transmission pattern indicated by the transmission pattern information, and according to the quantity of repetitions of the data packet, in a frequency domain position indicated by the frequency domain resource information, in a transmission subframe indicated by the quantity of cycles that can be occupied, the user data repeatedly transmitted by the transmitting UE.

According to the first possible implementation manner of the sixth aspect, in a second possible implementation manner of the sixth aspect, the repeatedly receiving, by the receiving UE according to the scheduling signaling, according to a transmission pattern indicated by the transmission pattern information, and according to the quantity of repetitions of the data packet, in a frequency domain position indicated by the frequency domain resource information, in a transmission subframe indicated by the quantity of cycles that can be occupied, the user data repeatedly transmitted by the transmitting UE, includes the following. Transmitting, by the receiving UE according to the transmission pattern information, first user data in a first subframe in a first frame to a second automatic repeat request HARQ process corresponding to the first subframe, and transmitting, by the receiving UE according to the transmission pattern information, second user data in a second subframe in a second frame to a third HARQ process corresponding to the second subframe.

According to the sixth aspect, in a third possible implementation manner of the sixth aspect, the scheduling signaling further includes an indication that a data packet is new data, where the indication that the data packet is new data is used to indicate that the user data to be transmitted by the transmitting UE is new data. The receiving, by the receiving UE according to the scheduling signaling, user data transmitted by the transmitting UE, includes receiving, by the receiving UE according to the scheduling signaling and according to a transmission pattern indicated by the transmission pattern information, in a frequency domain position indicated by the frequency domain resource information, in a transmission subframe indicated by the quantity of cycles that can be occupied, the new user data transmitted by the transmitting UE.

With reference to the sixth aspect or any one of the first to third possible implementation manners of the sixth aspect, in a fourth possible implementation manner of the sixth aspect, the scheduling signaling further includes a service type of the user data to be transmitted by the transmitting UE. The method further includes: creating, by the receiving UE according to the service type, a radio link control (RLC) entity corresponding to the service type; and configuring, by the receiving UE, parameters of the RLC entity according to a configuration table prestored in the receiving UE and corresponds to the service type.

In the device and method for data transmission in D2D communication that are provided by the embodiments, a transmission module transmits scheduling signaling to the receiving UE, where the scheduling signaling includes at least one of frequency domain resource information, a quantity of cycles that can be occupied, or transmission pattern information; and a processing module transmits user data to the receiving UE according to the scheduling signaling, so that the receiving UE receives the user data according to the scheduling signaling. Therefore, if there is no feedback from the receiving UE in a D2D communication process, the transmitting UE can repeatedly transmit the user data, and the receiving UE can repeatedly receive the user data and perform combination processing on the repeatedly received data, thereby improving reliability of data transmission.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show some embodiments, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments clearer, the following clearly describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope of the present disclosure.

Figure 1:
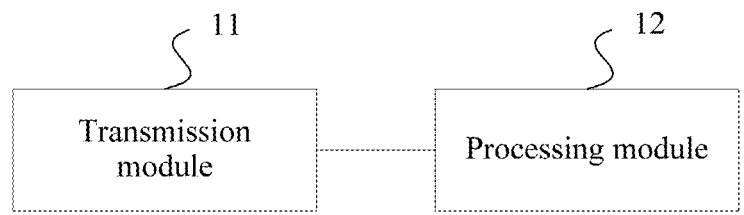
FIG. 1 is a schematic structural diagram of Embodiment 1 of transmitting user equipment.

FIG. 1 is a schematic structural diagram of Embodiment 1 of transmitting user equipment. As shown in FIG. 1, the transmitting user equipment in this embodiment includes a transmission module 11 and a processing module 12. The transmission module 11 is configured to transmit scheduling signaling to receiving UE, where the scheduling signaling includes at least one of frequency domain resource information, a quantity of cycles that can be occupied, or transmission pattern information. The processing module 12 is configured to transmit user data to the receiving UE according to the scheduling signaling, so that the receiving UE receives the user data according to the scheduling signaling.

Specifically, the frequency domain resource information in the scheduling information in this embodiment may include a frequency domain resource index or a maximum frequency domain resource range. If only one user transmits data at a same transmission time, the frequency domain resource information may be a maximum frequency domain resource range. If multiple users transmit data at a same transmission time, the frequency domain resource information is a frequency domain resource index, and the quantity of cycles that can be occupied is used to indicate a quantity of cycles that can be occupied by the user data transmitted by the transmitting UE.

Figure 2:
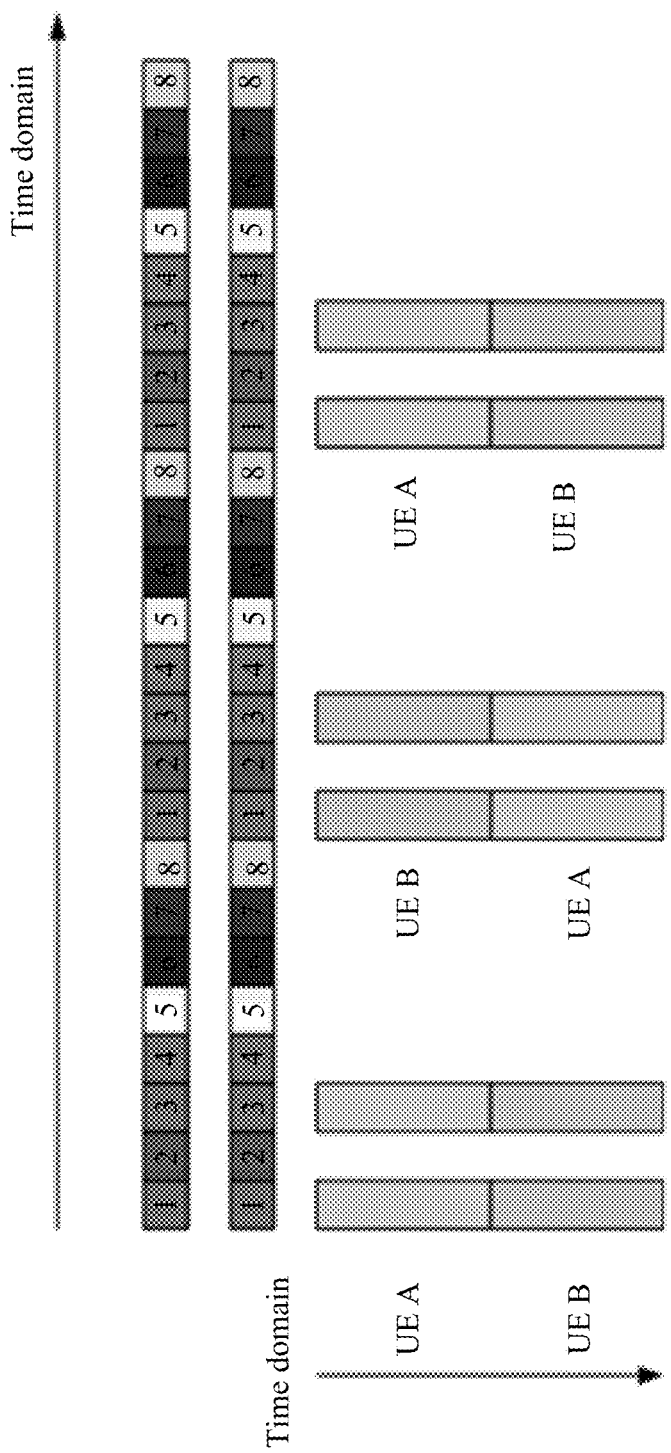
FIG. 2 is a schematic diagram of a transmission pattern in scheduling signaling.

FIG. 2 is a schematic diagram of a transmission pattern in the scheduling signaling. The transmission pattern information may include time that can be occupied by the transmitting UE in a cycle and a repetition mode of a data packet. As shown in FIG. 2, UE A may occupy the first and the third milliseconds for transmission in every eight milliseconds. The repetition mode of the data packet may include an immediate repetition, that is, a same data packet may be transmitted in the first and third milliseconds, or a discontinuous repetition and a minimum repetition interval, that is, after being transmitted, a data packet can be transmitted repeatedly only after waiting for a period of time. For example, in FIG. 2, a piece of data is transmitted in the first millisecond, and the data packet can be transmitted again only after waiting for 8 ms or a longer time.

Specifically, the scheduling signaling in this embodiment may include at least one of the frequency domain resource information, the quantity of cycles that can be occupied, and the transmission pattern information. If only one or two of the information are included, the other two or one of the information is fixed.

For example, in a scenario in which the scheduling signaling in this embodiment includes only the frequency domain resource information, the transmission pattern information and the quantity of cycles that can be occupied are fixed. In a scenario in which the scheduling signaling in this embodiment includes only the quantity of cycles that can be occupied, the frequency domain resource information and the transmission pattern information are fixed. It may be specified that a fixed correspondence exists between a frequency domain position occupied by the scheduling signaling and a frequency domain position occupied by the user data. For example, if the scheduling signaling is transmitted in a third symbol of every two physical resource blocks (PRB), data information is transmitted in any symbol except the third symbol and a pilot symbol in the two PRBs. In a scenario in which the scheduling signaling in this embodiment includes only the transmission pattern information, the frequency domain resource information and the quantity of cycles that can be occupied are fixed.

The processing module 12 of the transmitting UE transmits the to-be-transmitted user data according to the frequency domain resource information, the quantity of cycles that can be occupied, and the transmission pattern information in the scheduling signaling, in a frequency domain position indicated by the frequency domain resource information, in a transmission subframe indicated by the quantity of cycles that can be occupied. The receiving UE receives, according to the transmission pattern indicated by the transmission pattern information, in the frequency domain position indicated by the frequency domain resource information, in the transmission subframe indicated by the quantity of cycles that can be occupied, the user data transmitted by the transmitting UE.

According to the transmitting user equipment provided by this embodiment, repeated transmission of user data is determined by a processing module 12 of the transmitting UE according to scheduling signaling, and is not determined according to whether there is any feedback from receiving UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In the transmitting user equipment provided by this embodiment, a transmission module 11 transmits scheduling signaling to receiving UE, where the scheduling signaling includes at least one of frequency domain resource information, a quantity of cycles that can be occupied, or transmission pattern information. A processing module 12 transmits user data to the receiving UE according to the scheduling signaling, so that the receiving UE receives the user data according to the scheduling signaling. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In an embodiment, the scheduling signaling further includes a quantity of times of repeated transmission of a data packet. The processing module 12 is configured to repeatedly transmit the user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied.

In an embodiment, the processing module 12 is further configured to control an HARQ process of the transmitting UE to obtain a first PDU in a medium access control (MAC) packet data unit (PDU) buffer, and record a quantity of times of transmission as 0. If the HARQ process determines, according to an identifier of the HARQ process and the transmission pattern, that a transmission subframe of the first PDU arrives, transmit the first PDU to the receiving UE by using the transmission subframe of the first PDU, and add 1 to the quantity of times of transmission, until the quantity of times of transmission reaches the quantity of times of repeated transmission of the data packet.

Figure 3:
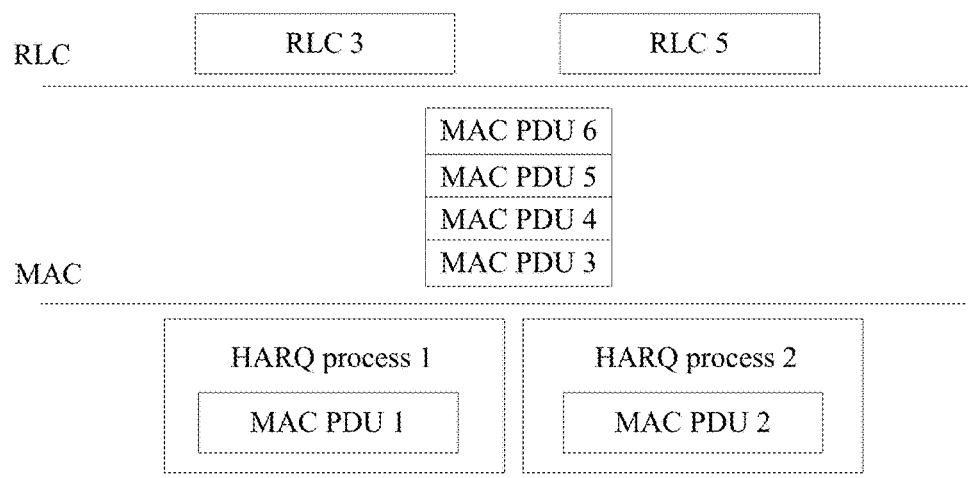
FIG. 3 is a schematic diagram of UE.

FIG. 3 is a schematic diagram of UE. As shown in FIG. 3, a radio link control (RLC) module and a MAC module exist in the UE. The MAC module includes a PDU buffer and an HARQ process. The HARQ process is configured to perform data transmission (including initial transmission and repeated transmission), perform data reception and combination check, and deliver data to the PDU buffer. A quantity of HARQ processes is defined according to a processing capability of the UE. In a cellular system, generally, it is considered that there are eight HARQ processes. In a multiple-input multiple-output system, there may be 16 HARQ processes. For a D2D group user, a case of coexistence of D2D communication and cellular communication may occur, or either of D2D communication and cellular communication may occur. For convenient and simple implementation of the UE, HARQ processes may be used by the cellular communication and the D2D communication jointly. That is, when there is only cellular communication, all the HARQ processes are occupied by cellular communication. When there is only D2D communication, all the HARQ processes are occupied by the D2D communication. When there are both D2D communication and cellular communication, they separately occupy some HARQ processes.

In this embodiment, it may be assumed that there is only D2D communication, and that all the HARQ processes may be occupied by the D2D communication.

When the UE is used as transmitting UE, for example, it is determined, according to the information in the scheduling signaling, that data may be transmitted in two time subframes, and therefore, the UE decides that two services, namely, one service represented by RLC 3 and another service represented by RLC 5, are both used to transmit data. Therefore, data packets of two services exist in the MAC PDU buffer, where quantities of times of repeated transmission of the data packets of the services may be the same or may be different. The following uses an example in which quantities of times of repeated transmission are the same, where RLC 3 represents a voice service, RLC 5 represents a picture transmission service, and maximum quantities of times of repeated transmission of the two services are both 4. Multiple data packets are separately generated in the two services, and transmitted to the MAC PDU buffer. An HARQ process fetches a new PDU from the MAC PDU buffer according to a transmission status of the HARQ process after a previous data packet is repeatedly transmitted for four times, and records a quantity of times of transmission as 0. After a transmission subframe of the UE arrives, the HARQ process transmits the new PDU, and changes the quantity of times of transmission Tx_NB to Tx_NB+1 after transmission. When the quantity of times of transmission reaches an allowed maximum quantity of times of repeated transmission, namely, Tx_NB=4, the HARQ process fetches new data from the MAC PDU buffer. After a MAC PDU is fetched by the HARQ process, the fetched MAC PDU is deleted from the MAC PDU buffer.

Figure 4:
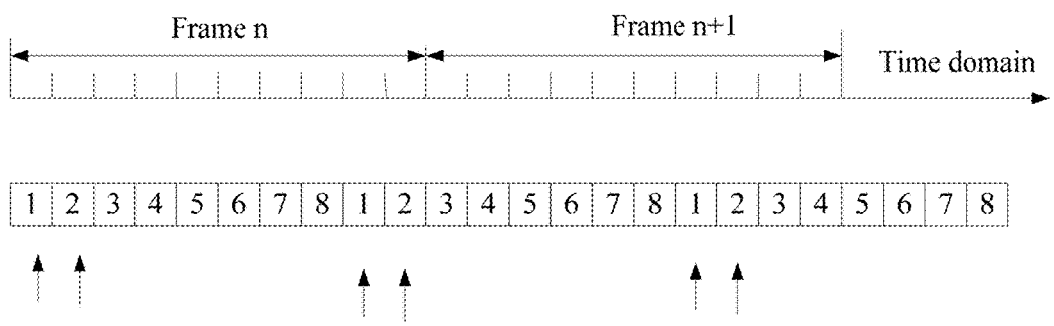
FIG. 4 is a schematic diagram of a correspondence between a transmission subframe number and an HARQ process identifier.

FIG. 4 is a schematic diagram of a correspondence between a transmission subframe number and an HARQ process identifier. As shown in FIG. 4, a conversion relationship between a transmission subframe number and an HARQ process identifier is: (frame number*10+subframe number) mod 8=1&2. By using this formula, the HARQ process may calculate whether a next subframe is a subframe for transmitting data by the HARQ process. The calculation process may also be performed a longer time in advance. Data transmission is completed by a physical layer. The identifier of the HARQ process used in transmission is obtained through calculation according to the transmission pattern in the scheduling signaling. That is, the transmitting UE uses HARQ processes 1 and 2 to process transmission of MAC PDUs, and the receiving UE demodulates the received data and then transmits the data to a process whose HARQ process identifier is 1 or 2 for processing.

In an embodiment, if a resource corresponding to a first HARQ process is allocated to another transmitting UE for use, the processing module 12 stops using the first HARQ process after the quantity of times of transmission reaches the quantity of times of repeated transmission of the data packet.

For example, processing after the transmission pattern of the transmitting UE is changed is described in this embodiment. When UE B in a D2D group has service data of a higher priority for transmission, a transmission resource of UE A is preempted by UE B, and transmission resources of UE A are reduced. For example, in each frame, two subframes that may transmit data of UE A are reduced to only one subframe that may transmit data of UE A. Therefore, a case in which data in an HARQ process buffer cannot be transmitted again but a quantity of times of repeated transmission is not completed yet may occur, and this is because the HARQ process is associated with a transmission subframe number. To ensure reliable data transmission, UE A may not use the process any longer after continuing to repeatedly transmit the data in the HARQ process buffer for a remaining quantity of times. After obtaining information indicating that the resource may be used, UE B starts to use the resource after waiting for a period equal to a quantity of repetitions multiplied by a repetition interval.

In the transmitting user equipment provided by this embodiment, a transmission module 11 of the transmitting UE transmits scheduling signaling to receiving UE, where the scheduling signaling includes frequency domain resource information, a quantity of cycles that can be occupied, transmission pattern information, and a quantity of times of repeated transmission of a data packet. A processing module 12 of the transmitting UE repeatedly transmits user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In an embodiment, the processing module 12 is further configured to control a MAC PDU buffer of the transmitting UE to transmit a second PDU to an HARQ process of the transmitting UE, and record a quantity of times of transmission as 1, so that when the HARQ process determines that a transmission subframe of the first PDU arrives, the HARQ process transmits the second PDU to the receiving UE by using the transmission subframe of the second PDU. When the MAC PDU buffer determines, according to the transmission pattern, that a minimum repetition interval expires, the transmitting UE may transmit the second PDU to the HARQ process again, until the quantity of times of transmission reaches the quantity of times of repeated transmission of the data packet, where the second PDU includes an identifier of the transmitting HARQ process.

Specifically, after the HARQ process fetches data, the MAC PDU buffer of the transmitting end may continue to reserve the PDU, and change a counter value from Current_TX_NB to Current_TX_NB+1. The HARQ process fetches data from a MAC PDU when performing transmission every time, and the MAC PDU buffer provides appropriate data to the HARQ process according to a transmission status and a repetition status of a PDU. For example, if the transmitting UE obtains transmission capabilities of two consecutive subframes in a frame, a first subframe transmits a MAC PDU 1, and a second subframe must transmit a MAC PDU 2 and cannot continue to transmit the MAC PDU 1, because the scheduling signaling requires that a repeated transmission interval of each packet should not be 0. Therefore, when the repeated transmission interval is satisfied, the MAC PDU buffer provides a repeated data packet to the HARQ process, and a case in which data packets transmitted at the first time and subsequently repeatedly transmitted use different subframe numbers may occur. In this case, the transmitting UE needs to notify, in the data packet, a process number used by the transmitting UE to the receiving end, so that the receiving UE can combine the received repeated data. After receiving a new data packet, the receiving UE demodulates the data packet into soft bits and then transmits the soft bits to an HARQ process buffer corresponding to the data packet, and after a repeated packet of the data packet arrives, also transmits soft bits to a corresponding HARQ process buffer according to a process number carried in the repeated packet and performs combination.

In the transmitting user equipment provided by this embodiment, a transmission module 11 of the transmitting UE transmits scheduling signaling to receiving UE, where the scheduling signaling includes frequency domain resource information, a quantity of cycles that can be occupied, transmission pattern information, and a quantity of times of repeated transmission of a data packet. A processing module 12 of the transmitting UE repeatedly transmits user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In an embodiment, the scheduling signaling further includes an indication that a data packet is new data, where the indication that the data packet is new data is used to indicate that the user data to be transmitted by the transmitting UE is new data.

Specifically, if the user data to be transmitted by the transmitting UE is new data, the scheduling signaling further includes the indication that the data packet is new data; if the user data to be transmitted by the transmitting UE is data that is transmitted repeatedly, the scheduling signaling does not include the indication that the data packet is new data.

In an embodiment, the scheduling signaling further includes identifier information of the transmitting UE, where the identifier information is used to indicate a priority of using a frequency domain resource by the transmitting UE.

Specifically, the identifier information of the UE may be a global identifier in a large area, or may be an intra-group identifier allocated by a group owner. The identifier information of the UE has a meaning indicating a priority. If another UE also uses a same resource, after the UE detects a collision, UE having smaller UE identifier information may preferentially use the resource.

In an embodiment, the scheduling signaling further includes a service type of the user data to be transmitted by the transmitting UE.

In an embodiment, the processing module 12 is further configured to generate the scheduling signaling before the transmission module 11 transmits the scheduling signaling to the receiving UE; or receive the scheduling signaling transmitted by a base station before the transmission module n transmits the scheduling signaling to the receiving UE.

Specifically, the scheduling signaling transmitted by the transmission module n of the transmitting UE to the receiving UE may be generated by the transmitting UE, or may be received by the transmitting UE from the base station.

In the transmitting user equipment provided by this embodiment, a transmission module 11 of the transmitting UE transmits scheduling signaling to receiving UE, where the scheduling signaling includes frequency domain resource information, a quantity of cycles that can be occupied, or transmission pattern information. A processing module 12 of the transmitting UE transmits user data to the receiving UE according to the scheduling signaling, so that the receiving UE receives the user data according to the scheduling signaling. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

Figure 5:
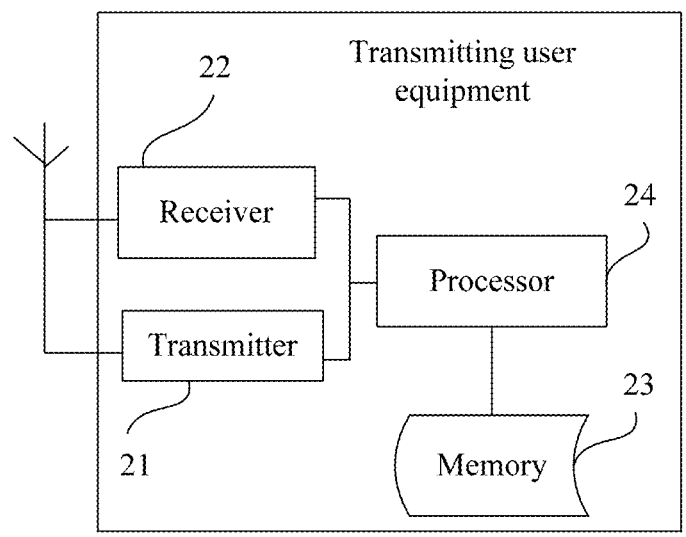
FIG. 5 is a schematic structural diagram of Embodiment 2 of transmitting user equipment.

FIG. 5 is a schematic structural diagram of Embodiment 2 of transmitting user equipment. As shown in FIG. 5, the transmitting user equipment in this embodiment includes a transmitter 21, a receiver 22, a memory 23, and a processor 24 that is connected to the transmitter 21, the receiver 22, and the memory 23. Certainly, the user equipment may further include a universal component such as an antenna, a baseband processing unit, an intermediate radio frequency processing unit, or an input and output apparatus, which is not limited any longer in the embodiment.

The transmitter 21 is configured to transmit scheduling signaling to receiving UE, where the scheduling signaling includes at least one of frequency domain resource information, a quantity of cycles that can be occupied, or transmission pattern information; and the processor 24 is configured to transmit user data to the receiving UE according to the scheduling signaling, so that the receiving UE receives the user data according to the scheduling signaling.

In an embodiment, the scheduling signaling further includes a quantity of times of repeated transmission of a data packet. The processor 24 is configured to repeatedly transmit the user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied.

In an embodiment, the processor 24 is further configured to control an automatic repeat request HARQ process of the transmitting UE to: obtain a first PDU in a medium access control packet data unit MAC PDU buffer, and record a quantity of times of transmission as 0; and if the HARQ process determines, according to an identifier of the HARQ process and the transmission pattern, that a transmission subframe of the first PDU arrives, transmit the first PDU to the receiving UE by using the transmission subframe of the first PDU, and add 1 to the quantity of times of transmission, until the quantity of times of transmission reaches the quantity of times of repeated transmission of the data packet.

In an embodiment, if a resource corresponding to a first HARQ process is allocated to another transmitting UE for use, the processor 24 stops using the first HARQ process after the quantity of times of transmission reaches the quantity of times of repeated transmission of the data packet.

In an embodiment, the processor 24 is further configured to control a MAC PDU buffer of the transmitting UE to: transmit a second PDU to an HARQ process of the transmitting UE, and record a quantity of times of transmission as 1, so that when the HARQ process determines that a transmission subframe of the first PDU arrives, the HARQ process transmits the second PDU to the receiving UE by using the transmission subframe of the second PDU; and when the MAC PDU buffer determines, according to the transmission pattern, that a minimum repetition interval expires, transmit the second PDU to the HARQ process again, until the quantity of times of transmission reaches the quantity of times of repeated transmission of the data packet, where the second PDU includes an identifier of the transmitting HARQ process.

In an embodiment, the scheduling signaling further includes an indication that a data packet is new data, where the indication that the data packet is new data is used to indicate that the user data to be transmitted by the transmitting UE is new data.

In an embodiment, the scheduling signaling further includes identifier information of the transmitting UE, where the identifier information is used to indicate a priority of using a frequency domain resource by the transmitting UE.

In an embodiment, the scheduling signaling further includes a service type of the user data to be transmitted by the transmitting UE.

In an embodiment, the processor 24 is further configured to generate the scheduling signaling before the transmitter 21 transmits the scheduling signaling to the receiving UE; or receive the scheduling signaling transmitted by a base station before the transmitter 21 transmits the scheduling signaling to the receiving UE.

The transmitting UE in this embodiment is an entity embodiment corresponding to the embodiment shown in FIG. 1, and their implementation principles and technical effects are similar, and are not further described herein.

Figure 6:
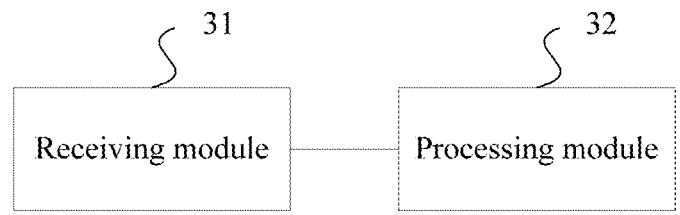
FIG. 6 is a schematic structural diagram of Embodiment 1 of receiving user equipment.

FIG. 6 is a schematic structural diagram of Embodiment 1 of receiving user equipment. As shown in FIG. 6, the receiving user equipment in this embodiment includes a receiving module 31 and a processing module 32. The receiving module 31 is configured to receive scheduling signaling transmitted by transmitting UE, where the scheduling signaling includes at least one of frequency domain resource information, a quantity of cycles that can be occupied, or transmission pattern information. The processing module 32 is configured to receive, according to the scheduling signaling received by the receiving module 31, user data transmitted by the transmitting UE.

According to the receiving user equipment provided by this embodiment, repeated transmission of user data is determined by transmitting UE, and is not determined according to whether there is any feedback from the receiving UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In the receiving user equipment provided by this embodiment, a receiving module 31 receives scheduling signaling transmitted by transmitting UE, where the scheduling signaling includes at least one of frequency domain resource information, a quantity of cycles that can be occupied, or transmission pattern information; and a processing module 32 receives, according to the scheduling signaling received by the receiving module 31, user data transmitted by the transmitting UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In an embodiment, the scheduling signaling further includes a quantity of times of repeated transmission of a data packet. The processing module 32 is configured to repeatedly receive, according to the scheduling signaling received by the receiving module 31, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied, the user data repeatedly transmitted by the transmitting UE.

Specifically, the processing module 32 receives the data packet according to the frequency domain position and the transmission pattern that are included in the scheduling signaling received by the receiving module 31. Because the transmitting UE needs to perform repeated transmission for multiple times, the receiving UE needs to demodulate the repeatedly transmitted data at a physical layer and then transmit the data to a soft bit buffer for combination processing, and if a cyclic redundancy check (CRC) check after combination is correct, deliver the data to an upper layer, or if a CRC check after combination is incorrect, continue to wait for a next repeated data packet, until a quantity of repetitions reaches a quantity of repetitions that is specified by the scheduling signaling. After the data is delivered to the upper layer or a maximum quantity of repetitions is reached or new data is received, the soft bit buffer is cleared.

In an embodiment, the processing module 32 is further configured to transmit, according to the transmission pattern information, first user data in a first subframe in a first frame to a second automatic repeat request HARQ process corresponding to the first subframe, and transmit, according to the transmission pattern information, second user data in a second subframe in a second frame to a third HARQ process corresponding to the second subframe.

Still using a schematic diagram of UE shown in FIG. 3 as an example, the transmitting UE transmits, in a subframe 1 in a system frame number (SFN) x, a MAC PDU 1 corresponding to an RLC 3 service, and transmits, in a subframe 2, a MAC PDU 2 corresponding to an RLC 5 service. Because five repetitions are required, when an SFN x+1 arrives later, the MAC PDU 1 is transmitted repeatedly in the subframe 1 and the MAC PDU 2 is transmitted repeatedly in the subframe 2, until the two MAC PDUs are transmitted for four times. The receiving UE transmits, according to the transmission pattern information, data received in the subframe 1 in the SFN x to an HARQ process 1 for processing, and transmits data received in the subframe 2 in the SFN x to an HARQ process 2 for processing. Data received by the receiving UE in the subframe 1 in the SFN x+1 is still transmitted to the HARQ process 1 for processing, and data in the subframe 2 is transmitted to the HARQ process 2 for processing. Data received multiple times is demodulated into soft bits at the physical layer, and the soft bits are combined. If a CRC check after the combination is correct, the soft bit buffer in the HARQ process is cleared.

In an embodiment, the scheduling signaling further includes an indication that a data packet is new data, where the indication that the data packet is new data is used to indicate that the user data to be transmitted by the transmitting UE is new data. The processing module 32 is further configured to receive, according to the scheduling signaling received by the receiving module 31 and according to a transmission pattern indicated by the transmission pattern information, in a frequency domain position indicated by the frequency domain resource information, in a transmission subframe indicated by the quantity of cycles that can be occupied, the new user data transmitted by the transmitting UE.

In an embodiment, the scheduling signaling further includes a service type of the user data to be transmitted by the transmitting UE. The processing module 32 is further configured to create, according to the service type, a radio link control RLC entity corresponding to the service type; and configure parameters of the RLC entity according to a configuration table that is in configuration tables prestored in the receiving UE and corresponds to the service type.

Specifically, an RLC layer of the receiving UE creates the RLC entity according to a service type field in the received scheduling information, and configures the parameters of the RLC entity according to the service type in the configuration table. The configuration table is stored by the UE in a hardware device of the UE, for example, in a SIM card, or in other devices such as a communications chip, or may be stored in a memory or a random access memory (RAM) or a flash memory (flash). The RLC entity configuration parameters include a reordering timer time length (or referred to as "reordering time length") and a packet sequence number reordering window size (or referred to as "reordering window size").

In the receiving user equipment provided by this embodiment, a receiving module 31 receives scheduling signaling transmitted by transmitting UE, where the scheduling signaling includes frequency domain resource information, a quantity of cycles that can be occupied, or transmission pattern information; and a processing module 32 receives, according to the scheduling signaling, user data transmitted by the transmitting UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

Figure 7:
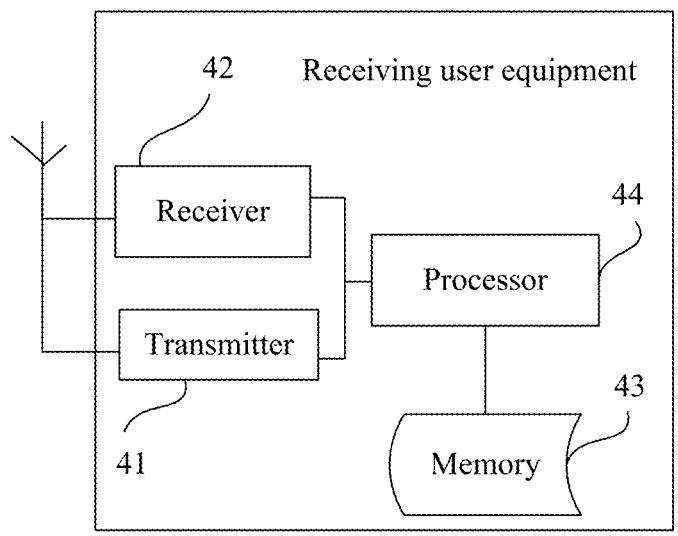
FIG. 7 is a schematic structural diagram of Embodiment 2 of receiving user equipment.

FIG. 7 is a schematic structural diagram of Embodiment 2 of receiving user equipment. As shown in FIG. 7, the receiving user equipment in this embodiment includes a transmitter 41, a receiver 42, a memory 43, and a processor 44 that is connected to the transmitter 41, the receiver 42, and the memory 43. Certainly, the user equipment may further include a universal component such as an antenna, a baseband processing unit, an intermediate radio frequency processing unit, or an input and output apparatus, which is not limited any longer in the embodiment.

The receiver 42 is configured to receive scheduling signaling transmitted by transmitting UE, where the scheduling signaling includes at least one of frequency domain resource information, a quantity of cycles that can be occupied, or transmission pattern information; and the processor 44 is configured to receive, according to the scheduling signaling received by the receiver 42, user data transmitted by the transmitting UE.

In an embodiment, the scheduling signaling further includes a quantity of times of repeated transmission of a data packet. The processor 44 is configured to repeatedly receive, according to the scheduling signaling received by the receiver 42, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied, the user data repeatedly transmitted by the transmitting UE.

In an embodiment, the processor 44 is further configured to transmit, according to the transmission pattern information, first user data in a first subframe in a first frame to a second automatic repeat request HARQ process corresponding to the first subframe, and transmit, according to the transmission pattern information, second user data in a second subframe in a second frame to a third HARQ process corresponding to the second subframe.

In an embodiment, the scheduling signaling further includes an indication that a data packet is new data, where the indication that the data packet is new data is used to indicate that the user data to be transmitted by the transmitting UE is new data. The processor 44 is further configured to receive, according to the scheduling signaling received by the receiver 42 and according to a transmission pattern indicated by the transmission pattern information, in a frequency domain position indicated by the frequency domain resource information, in a transmission subframe indicated by the quantity of cycles that can be occupied, the new user data transmitted by the transmitting UE.

In an embodiment, the scheduling signaling further includes a service type of the user data to be transmitted by the transmitting UE. The processor 44 is further configured to create, according to the service type, a radio link control RLC entity corresponding to the service type; and configure parameters of the RLC entity according to a configuration table that is in configuration tables prestored in the receiving UE and corresponds to the service type.

The receiving UE in this embodiment is an entity embodiment corresponding to the embodiment shown in FIG. 6, and their implementation principles and technical effects are similar, and are not further described herein.

Figure 8:
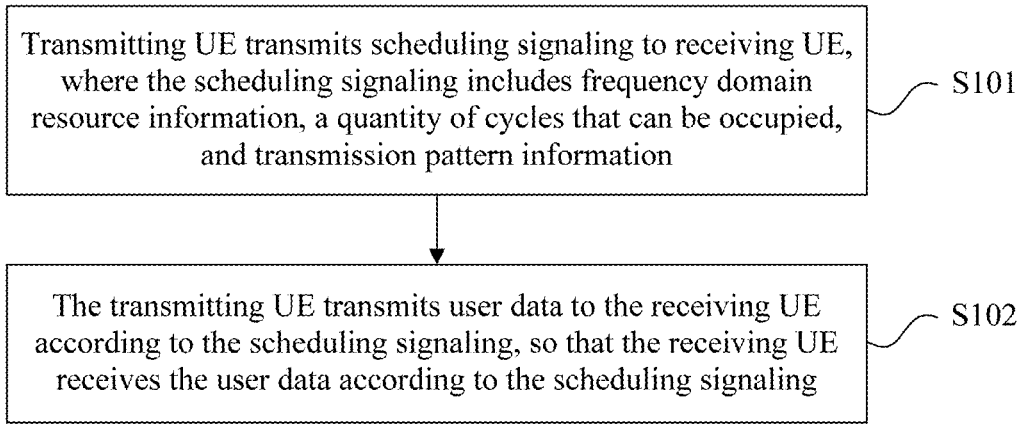
FIG. 8 is a flowchart of Embodiment 1 of a method for data transmission in D2D communication.

FIG. 8 is a flowchart of Embodiment 1 of a method for data transmission in D2D communication. As shown in FIG. 8, the method for data transmission in D2D communication in this embodiment includes the following.

S101. Transmitting UE transmits scheduling signaling to receiving UE, where the scheduling signaling includes at least one of frequency domain resource information, a quantity of cycles that can be occupied, or transmission pattern information.

Specifically, the frequency domain resource information in the scheduling information in this embodiment may include a frequency domain resource index or a maximum frequency domain resource range. If only one user transmits data at a same transmission time, the frequency domain resource information may be a maximum frequency domain resource range. If multiple users transmit data at a same transmission time, the frequency domain resource information is a frequency domain resource index, and the quantity of cycles that can be occupied is used to indicate a quantity of cycles that can be occupied by user data transmitted by the transmitting UE.

For a transmission pattern in the scheduling signaling in this embodiment, refer to the schematic diagram of the transmission pattern shown in FIG. 2 and related descriptions.

Specifically, the scheduling signaling in this embodiment may include at least one of the frequency domain resource information, the quantity of cycles that can be occupied, and the transmission pattern information. If only one or two of the information are included, the other two or one of the information is fixed.

For example, in a scenario in which the scheduling signaling in this embodiment includes only the frequency domain resource information, the transmission pattern information and the quantity of cycles that can be occupied are fixed. In a scenario in which the scheduling signaling in this embodiment includes only the quantity of cycles that can be occupied, the frequency domain resource information and the transmission pattern information are fixed. It may be specified that a fixed correspondence exists between a frequency domain position occupied by the scheduling signaling and a frequency domain position occupied by the user data. For example, if the scheduling signaling is transmitted in a third symbol of every two PRBs, data information is transmitted in any symbol except the third symbol and a pilot symbol in the two PRBs. In a scenario in which the scheduling signaling in this embodiment includes only the transmission pattern information, the frequency domain resource information and the quantity of cycles that can be occupied are fixed.

S102. The transmitting UE transmits user data to the receiving UE according to the scheduling signaling, so that the receiving UE receives the user data according to the scheduling signaling.

Specifically, the transmitting UE transmits the to-be-transmitted user data according to the frequency domain resource information, the quantity of cycles that can be occupied, and the transmission pattern information in the scheduling signaling, in a frequency domain position indicated by the frequency domain resource information, in a transmission subframe indicated by the quantity of cycles that can be occupied; and the receiving UE receives, according to the transmission pattern indicated by the transmission pattern information, in the frequency domain position indicated by the frequency domain resource information, in the transmission subframe indicated by the quantity of cycles that can be occupied, the user data transmitted by the transmitting UE.

In the method for data transmission in D2D communication according to this embodiment, repeated transmission of user data is determined by transmitting UE, and is not determined according to whether there is any feedback from receiving UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In the method for data transmission in D2D communication according to this embodiment, transmitting UE transmits scheduling signaling to receiving UE, where the scheduling signaling includes frequency domain resource information, a quantity of cycles that can be occupied, or transmission pattern information; and the transmitting UE transmits user data to the receiving UE according to the scheduling signaling, so that the receiving UE receives the user data according to the scheduling signaling. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In an embodiment, the scheduling signaling further includes a quantity of times of repeated transmission of a data packet.

Step S102 may include repeatedly transmitting, by the transmitting UE, the user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied.

In an embodiment, the repeatedly transmitting, by the transmitting UE, the user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied, includes obtaining, by an HARQ process of the transmitting UE, a first PDU in a MAC PDU buffer, and recording a quantity of times of transmission as 0. The repeatedly transmitting also includes transmitting the first PDU to the receiving UE by using the transmission subframe of the first PDU, and adding 1 to the quantity of times of transmission, until the quantity of times of transmission reaches the quantity of times of repeated transmission of the data packet, in response to the HARQ process of the transmitting UE determining, according to an identifier of the HARQ process and the transmission pattern, that a transmission subframe of the first PDU arrives.

For an RLC module and a MAC module included in the UE in this embodiment, a PDU buffer and the HARQ process included in the MAC module, and a processing procedure of the transmitting UE, refer to the schematic diagram of the UE shown in FIG. 3 and related descriptions.

For a correspondence between a transmission subframe number and an HARQ process identifier in this embodiment, refer to the schematic diagram of a correspondence between a transmission subframe number and an HARQ process identifier shown in FIG. 4 and related descriptions.

Further, if a resource corresponding to a first HARQ process is allocated to another transmitting UE for use, the transmitting UE stops using the first HARQ process after the quantity of times of transmission reaches the quantity of times of repeated transmission of the data packet.

For example, processing after the transmission pattern of the transmitting UE is changed is described in this embodiment. When UE B in a D2D group has service data of a higher priority for transmission, a transmission resource of UE A is preempted by UE B, and transmission resources of UE A are reduced. For example, in each frame, two subframes that may transmit data of UE A are reduced to only one subframe that may transmit data of UE A. Therefore, a case in which data in an HARQ process buffer cannot be transmitted again but a quantity of times of repeated transmission is not completed yet may occur, and this is because the HARQ process is associated with a transmission subframe number. To ensure reliable data transmission, UE A may not use the process any longer after continuing to repeatedly transmit the data in the HARQ process buffer for a remaining quantity of times. After obtaining information indicating that the resource may be used, UE B starts to use the resource after waiting for a period equal to a quantity of repetitions multiplied by a repetition interval.

In the method for data transmission in D2D communication according to this embodiment, transmitting UE transmits scheduling signaling to receiving UE, where the scheduling signaling includes frequency domain resource information, a quantity of cycles that can be occupied, transmission pattern information, and a quantity of times of repeated transmission of a data packet; and the transmitting UE repeatedly transmits user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In an embodiment, the repeatedly transmitting, by the transmitting UE, the user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied, includes transmitting, by a MAC PDU buffer of the transmitting UE, a second PDU to an HARQ process of the transmitting UE, and recording a quantity of times of transmission as 1, so that when the HARQ process determines that a transmission subframe of the first PDU arrives, the HARQ process transmits the second PDU to the receiving UE by using the transmission subframe of the second PDU. The repeatedly transmitting also includes transmitting the second PDU to the HARQ process again, until the quantity of times of transmission reaches the quantity of times of repeated transmission of the data packet, where the second PDU includes an identifier of the transmitting HARQ process, in response to the MAC PDU buffer of the transmitting UE determining, according to the transmission pattern, that a minimum repetition interval expires.

Specifically, after the HARQ process fetches data, the MAC PDU buffer of the transmitting end may continue to reserve the PDU, and change a counter value from Current_TX_NB to Current_TX_NB+1. The HARQ process fetches data from a MAC PDU when performing transmission every time, and the MAC PDU buffer provides appropriate data to the HARQ process according to a transmission status and a repetition status of a PDU. For example, if the transmitting UE obtains transmission capabilities of two consecutive subframes in a frame, a first subframe transmits a MAC PDU 1, and a second subframe must transmit a MAC PDU 2 and cannot continue to transmit the MAC PDU 1, because the scheduling signaling requires that a repeated transmission interval of each packet should not be 0. Therefore, when the repeated transmission interval is satisfied, the MAC PDU buffer provides a repeated data packet to the HARQ process, and a case in which data packets transmitted at the first time and subsequently repeatedly transmitted use different subframe numbers may occur. In this case, the transmitting UE needs to notify, in the data packet, a process number used by the transmitting UE to the receiving end, so that the receiving UE can combine the received repeated data. After receiving a new data packet, the receiving UE demodulates the data packet into soft bits and then transmits the soft bits to an HARQ process buffer corresponding to the data packet, and after a repeated packet of the data packet arrives, also transmits soft bits to a corresponding HARQ process buffer according to a process number carried in the repeated packet and performs combination.

In the method for data transmission in D2D communication according to this embodiment, transmitting UE transmits scheduling signaling to receiving UE, where the scheduling signaling includes frequency domain resource information, a quantity of cycles that can be occupied, transmission pattern information, and a quantity of times of repeated transmission of a data packet; and the transmitting UE repeatedly transmits user data to the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In an embodiment, the scheduling signaling further includes an indication that a data packet is new data, where the indication that the data packet is new data is used to indicate that the user data to be transmitted by the transmitting UE is new data.

Specifically, if the user data to be transmitted by the transmitting UE is new data, the scheduling signaling further includes the indication that the data packet is new data; if the user data to be transmitted by the transmitting UE is data that is transmitted repeatedly, the scheduling signaling does not include the indication that the data packet is new data.

In an embodiment, the scheduling signaling further includes identifier information of the transmitting UE, where the identifier information is used to indicate a priority of using a frequency domain resource by the transmitting UE.

Specifically, the identifier information of the UE may be a global identifier in a large area, or may be an intra-group identifier allocated by a group owner. The identifier information of the UE has a meaning indicating a priority. If another UE also uses a same resource, after the UE detects a collision, UE having smaller UE identifier information may preferentially use the resource.

In an embodiment, the scheduling signaling further includes a service type of the user data to be transmitted by the transmitting UE.

In an embodiment, before the transmitting UE transmits the scheduling signaling to the receiving UE, the method further includes generating, by the transmitting UE, the scheduling signaling; or receiving, by the transmitting UE, the scheduling signaling transmitted by a base station.

Specifically, the scheduling signaling transmitted by the transmitting UE to the receiving UE may be generated by the transmitting UE, or may be received by the transmitting UE from the base station.

In the method for data transmission in D2D communication according to this embodiment, transmitting UE transmits scheduling signaling to receiving UE, where the scheduling signaling includes frequency domain resource information, a quantity of cycles that can be occupied, or transmission pattern information; and the transmitting UE transmits user data to the receiving UE according to the scheduling signaling, so that the receiving UE receives the user data according to the scheduling signaling. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

Embodiment 1 of the foregoing method for data transmission in D2D communication may be performed by the transmitting UE in FIG. 1 or FIG. 5.

Figure 9:
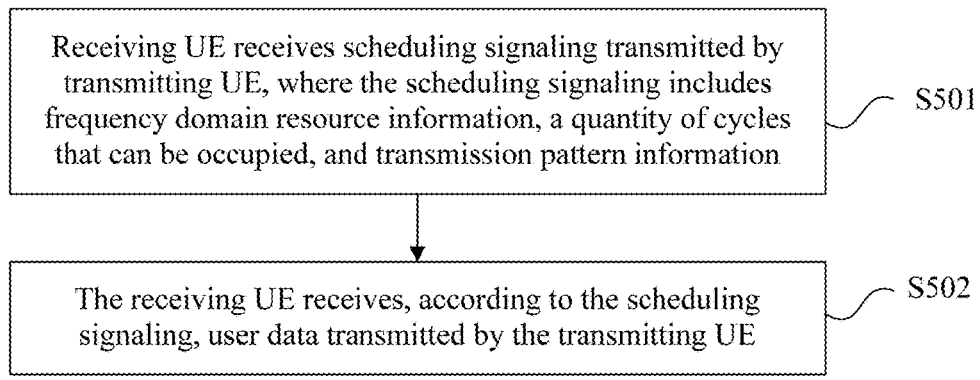
FIG. 9 is a flowchart of Embodiment 2 of a method for data transmission in D2D communication.

FIG. 9 is a flowchart of Embodiment 2 of a method for data transmission in D2D communication. As shown in FIG. 9, the method for data transmission in D2D communication in this embodiment includes:

S501. Receiving UE receives scheduling signaling transmitted by transmitting UE, where the scheduling signaling includes at least one of frequency domain resource information, a quantity of cycles that can be occupied, or transmission pattern information.

S502. The receiving UE receives, according to the scheduling signaling, user data transmitted by the transmitting UE.

In the method for data transmission in D2D communication according to this embodiment, repeated transmission of user data is determined by transmitting UE, and is not determined according to whether there is any feedback from receiving UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In the method for data transmission in D2D communication according to this embodiment, receiving UE receives scheduling signaling transmitted by transmitting UE, where the scheduling signaling includes frequency domain resource information, a quantity of cycles that can be occupied, or transmission pattern information; and the receiving UE receives, according to the scheduling signaling, user data transmitted by the transmitting UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In an embodiment, the scheduling signaling further includes a quantity of times of repeated transmission of a data packet.

Step S502 may include repeatedly receiving, by the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied, the user data repeatedly transmitted by the transmitting UE.

Specifically, the receiving UE receives the data packet according to the frequency domain position and the transmission pattern information that are included in the previously received scheduling signaling. Because the transmitting UE needs to perform repeated transmission for multiple times, the receiving UE needs to demodulate the repeatedly transmitted data at a physical layer and then transmit the data to a soft bit buffer for combination processing, and if a CRC check after combination is correct, deliver the data to an upper layer, or if a CRC check after combination is incorrect, continue to wait for a next repeated data packet, until a quantity of repetitions reaches a quantity of repetitions that is specified by the scheduling signaling. After the data is delivered to the upper layer or a maximum quantity of repetitions is reached or new data is received, the soft bit buffer is cleared.

In an embodiment, the repeatedly receiving, by the receiving UE according to the scheduling signaling, according to a transmission pattern indicated by the transmission pattern information, and according to the quantity of times of repeated transmission of the data packet, in a frequency domain position indicated by the frequency domain resource information, in a transmission subframe indicated by the quantity of cycles that can be occupied, the user data repeatedly transmitted by the transmitting UE, includes transmitting, by the receiving UE according to the transmission pattern information, first user data in a first subframe in a first frame to a second automatic repeat request HARQ process corresponding to the first subframe, and transmitting, by the receiving UE according to the transmission pattern information, second user data in a second subframe in a second frame to a third HARQ process corresponding to the second subframe.

Still using a schematic diagram of UE shown in FIG. 3 as an example, the transmitting UE transmits, in a subframe 1 in an SFN x, a MAC PDU 1 corresponding to an RLC 3 service, and transmits, in a subframe 2, a MAC PDU 2 corresponding to an RLC 5 service. Because five repetitions are required, when an SFN x+1 arrives later, the MAC PDU 1 is transmitted repeatedly in the subframe 1 and the MAC PDU 2 is transmitted repeatedly in the subframe 2, until the two MAC PDUs are transmitted for four times. The receiving UE transmits, according to the transmission pattern information, data received in the subframe 1 in the SFN x to an HARQ process 1 for processing, and transmits data received in the subframe 2 in the SFN x to an HARQ process 2 for processing. Data received by the receiving UE in the subframe 1 in the SFN x+1 is still transmitted to the HARQ process 1 for processing, and data in the subframe 2 is transmitted to the HARQ process 2 for processing. Data received multiple times is demodulated into soft bits at the physical layer, and the soft bits are combined. If a CRC check after the combination is correct, the soft bit buffer in the HARQ process is cleared.

In an embodiment, the scheduling signaling further includes an indication that a data packet is new data, where the indication that the data packet is new data is used to indicate that the user data to be transmitted by the transmitting UE is new data. The receiving UE receiving, according to the scheduling signaling, user data transmitted by the transmitting UE, includes receiving, by the receiving UE according to the scheduling signaling and according to a transmission pattern indicated by the transmission pattern information, in a frequency domain position indicated by the frequency domain resource information, in a transmission subframe indicated by the quantity of cycles that can be occupied, the new user data transmitted by the transmitting UE.

In an embodiment, the scheduling signaling further includes a service type of the user data to be transmitted by the transmitting UE. The method in this embodiment further includes creating, by the receiving UE according to the service type, a radio link control RLC entity corresponding to the service type; and configuring, by the receiving UE, parameters of the RLC entity according to a configuration table that is in configuration tables prestored in the receiving UE and corresponds to the service type.

Specifically, an RLC layer of the receiving UE creates the RLC entity according to a service type field in the received scheduling information, and configures the parameters of the RLC entity according to the service type in the configuration table. The configuration table is stored by the UE in a hardware device of the UE, for example, in a SIM card, or in other devices such as a communications chip, or may be stored in a memory or a RAM or a flash. The RLC entity configuration parameters include a reordering timer time length and a packet sequence number reordering window size.

In the method for data transmission in D2D communication according to this embodiment, receiving UE receives scheduling signaling transmitted by transmitting UE, where the scheduling signaling includes frequency domain resource information, a quantity of cycles that can be occupied, or transmission pattern information; and the receiving UE receives, according to the scheduling signaling, user data transmitted by the transmitting UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

Embodiment 2 of the foregoing method for data transmission in D2D communication may be performed by the transmitting UE in FIG. 6 or FIG. 7.

The following describes a method for data transmission in D2D communication by using an interaction process between transmitting UE and receiving UE as an example.

Figure 10:
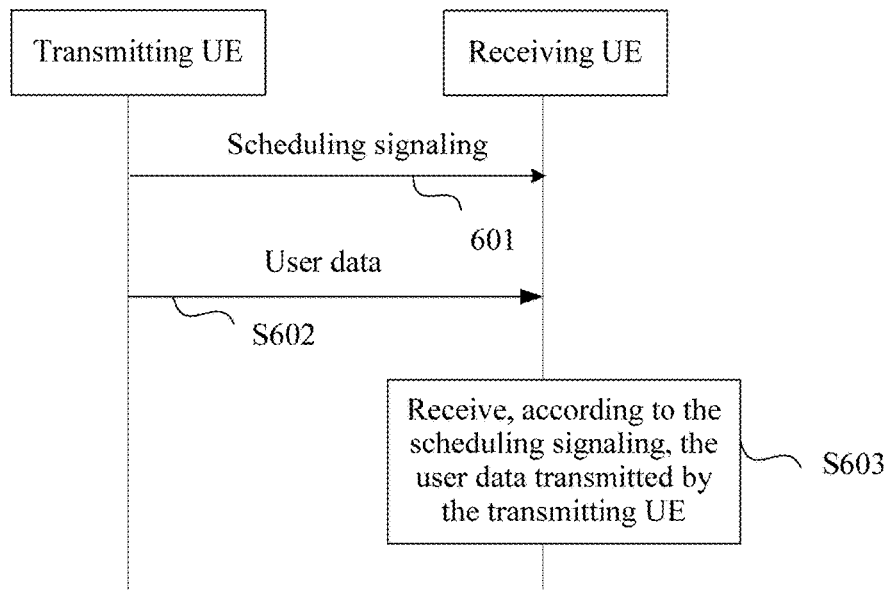
FIG. 10 is a flowchart of Embodiment 3 of a method for data transmission in D2D communication.

FIG. 10 is a flowchart of Embodiment 3 of a method for data transmission in D2D communication. As shown in FIG. 10, the method for data transmission in D2D communication in this embodiment includes the following.

S601. Transmitting UE transmits scheduling signaling to receiving UE, where the scheduling signaling includes at least one of frequency domain resource information, a quantity of cycles that can be occupied, or transmission pattern information.

S602. The transmitting UE transmits user data to the receiving UE according to the scheduling signaling.

S603. The receiving UE receives, according to the scheduling signaling, the user data transmitted by the transmitting UE.

In the method for data transmission in D2D communication according to this embodiment, transmitting UE transmits scheduling signaling to receiving UE, where the scheduling signaling includes frequency domain resource information, a quantity of cycles that can be occupied, or transmission pattern information; the transmitting UE transmits user data to the receiving UE according to the scheduling signaling; and the receiving UE receives, according to the scheduling signaling, the user data transmitted by the transmitting UE. Therefore, if there is no feedback from the receiving UE in a D2D communication process, the transmitting UE may repeatedly transmit the user data, and the receiving UE may repeatedly receive the user data and perform combination processing on the received repeated data, thereby improving reliability of data transmission.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A transmitting user equipment (UE), comprising:
a processor; and
a non-transitory computer-readable storage medium storing a program to be executed by the processor, the program including instructions for:
transmitting scheduling signaling to a receiving UE, wherein the scheduling signaling comprises frequency domain resource information and time resource pattern information;
performing an initial transmission of data to the receiving UE according to the scheduling signaling; and
performing a retransmission of the data to the receiving UE according to the scheduling signaling that is used with the initial transmission of the data;
wherein the receiving UE can receive the data in the retransmission, according to information in the scheduling signaling that is used to receive data in the initial transmission from the transmitting UE, wherein the scheduling signaling further comprises a quantity of repetitions of a data packet, and wherein the instructions for performing the retransmission of the data to the receiving UE according to the scheduling signaling comprises instructions for retransmitting the data, according to a time resource pattern, in a frequency domain position indicated by the frequency domain resource information.

2. The transmitting UE according to claim 1, wherein the scheduling signaling further comprises a quantity of cycles that can be occupied, and wherein the instructions for performing the retransmission of the data to the receiving UE according to the scheduling signaling comprises instructions for retransmitting the data, according to the time resource pattern indicated by the time resource pattern information, and according to the quantity of repetitions of the data packet, in the frequency domain position indicated by the frequency domain resource information, in a transmission subframe indicated by the quantity of cycles that can be occupied.

3. The transmitting UE according to claim 1, wherein the scheduling signaling further comprises an indication that a data packet is new data, wherein the indication that the data packet is new data is used to indicate that the data to be transmitted by the transmitting UE is new data.

4. The transmitting UE according to claim 1, wherein the scheduling signaling further comprises identifier information of the transmitting UE, and wherein the identifier information is used to indicate a priority of using a frequency domain resource by the transmitting UE.

5. The transmitting UE according to claim 1, wherein the scheduling signaling further comprises a service type of the data to be transmitted by the transmitting UE.

6. The transmitting UE according to claim 1, wherein the program further includes instructions for:
before transmitting the scheduling signaling to the receiving UE, generating the scheduling signaling; or
before transmitting the scheduling signaling to the receiving UE, receiving the scheduling signaling transmitted by a base station.

7. A receiving user equipment (UE), comprising: a processor; and
a non-transitory computer-readable storage medium storing a program to be executed by the processor, the program including instructions for:
receiving scheduling signaling transmitted by transmitting UE, wherein the scheduling signaling comprises frequency domain resource information and time resource pattern information;
receiving data in an initial transmission from the transmitting UE, according to information in the scheduling signaling that is received; and
receiving the data in a retransmission from the transmitting UE, according to the information in the scheduling signaling that is used for receiving the data in the initial transmission from the transmitting UE, wherein the scheduling signaling further comprises a quantity of repetitions of a data packet, and wherein the instructions for receiving the retransmission according to the scheduling signaling comprises instructions for receiving the retransmission, according to a time resource pattern, in a frequency domain position indicated by the frequency domain resource information.

8. The receiving UE according to claim 7, wherein the scheduling signaling further comprises a quantity of cycles that can be occupied, and wherein the instructions for receiving the retransmission, according to the information in the scheduling signaling comprises receiving the retransmission, according to the time resource pattern indicated by the time resource pattern information, and according to the quantity of repetitions of the data packet, in the frequency domain position indicated by the frequency domain resource information, in a transmission subframe indicated by the quantity of cycles that can be occupied, of the data from the transmitting UE.

9. The receiving UE according to claim 7, wherein the scheduling signaling further comprises a quantity of cycles that can be occupied and an indication that a data packet is new data, wherein the indication that the data packet is new data is used to indicate that the data to be transmitted by the transmitting UE is new data, and wherein the instructions for receiving the initial transmission, according to the information in the scheduling signaling, comprise instructions for receiving the initial transmission, according to a time resource pattern indicated by the time resource pattern information, in a frequency domain position indicated by the frequency domain resource information, in a transmission subframe indicated by the quantity of cycles that can be occupied, of the new data from the transmitting UE.

10. The receiving UE according to claim 7, wherein the scheduling signaling further comprises a service type of the data to be transmitted by the transmitting UE, and wherein the program further comprises instructions for:
   creating, according to the service type, a radio link control (RLC) entity corresponding to the service type; and
   configuring parameters of the RLC entity, according to a configuration table pre-stored in the receiving UE, and that corresponds to the service type.

11. A method, comprising:
   transmitting, by a transmitting user equipment (UE), scheduling signaling to a receiving UE, wherein the scheduling signaling comprises frequency domain resource information and time resource pattern information;
   performing, by the transmitting UE, an initial transmission of data to the receiving UE according to the scheduling signaling; and
   performing, by the transmitting UE, a retransmission of the data to the receiving UE according to the scheduling signaling that is used with the initial transmission of the data;
   wherein the receiving UE can receive the data in the retransmission, according to information in the scheduling signaling that is used to receive data in the initial transmission from the transmitting UE, wherein the scheduling signaling further comprises a quantity of repetitions of a data packet, and wherein performing the retransmission comprises retransmitting the data to the receiving UE, according to a time resource pattern, in a frequency domain position indicated by the frequency domain resource information.

12. The method according to claim 11, wherein the scheduling signaling further comprises a quantity of cycles that can be occupied; and
   wherein performing, by the transmitting UE, a retransmission of the data to the receiving UE according to the scheduling signaling, comprises:
      retransmitting, by the transmitting UE, the data to the receiving UE according to the scheduling signaling, according to the time resource pattern indicated by the time resource pattern information, and according to the quantity of repetitions of the data packet, in the frequency domain position indicated by the frequency domain resource information, in a transmission subframe indicated by the quantity of cycles that can be occupied.

13. The method according to claim 11, wherein the scheduling signaling further comprises an indication that a data packet is new data, wherein the indication that the data packet is new data is used to indicate that the data to be transmitted by the transmitting UE is new data.

14. The method according to claim 11, wherein the scheduling signaling further comprises identifier information of the transmitting UE, wherein the identifier information is used to indicate a priority of using a frequency domain resource by the transmitting UE.

15. The method according to claim 11, wherein the scheduling signaling further comprises a service type of the data to be transmitted by the transmitting UE.

16. The method according to claim 11, wherein the method further comprises:
   generating, by the transmitting UE, the scheduling signaling; or
   receiving, by the transmitting UE, the scheduling signaling transmitted by a base station.

17. A method, comprising:
   receiving, by a receiving user equipment (UE), scheduling signaling transmitted by a transmitting UE, wherein the scheduling signaling comprises frequency domain resource information and time resource pattern information;
   receiving, by the receiving UE, an initial transmission, according to information in the scheduling signaling, of data from the transmitting UE; and
   receiving, by the receiving UE, a retransmission of the data from the transmitting UE, according to the information in the scheduling signaling that is used for receiving the initial transmission of the data from the transmitting UE, wherein the scheduling signaling further comprises a quantity of repetitions of a data packet, and wherein receiving the retransmission comprises receiving the retransmission of the data from the transmitting UE, according to a time resource pattern, in a frequency domain position indicated by the frequency domain resource information.

18. The method according to claim 17, wherein the scheduling signaling further comprises a quantity of cycles that can be occupied, and wherein receiving, by the receiving UE, the retransmission of the data from the transmitting UE, according to the information in the scheduling signaling, comprises:
   receiving, by the receiving UE, the retransmission of the data from the transmitting UE, according to the time resource pattern indicated by the time resource pattern information, and according to the quantity of repetitions of the data packet, in the frequency domain position indicated by the frequency domain resource information, in a transmission subframe indicated by the quantity of cycles that can be occupied.

19. The method according to claim 17, wherein the scheduling signaling further comprises a quantity of cycles that can be occupied and an indication that a data packet is new data, wherein the indication that the data packet is new data is used to indicate that the data to be transmitted by the transmitting UE is new data, and wherein receiving, by the receiving UE, a retransmission of the data from the transmitting UE, according to the scheduling signaling, comprises:
   receiving, by the receiving UE, the retransmission of the new data from the transmitting UE, according to a time resource pattern indicated by the time resource pattern information, in a frequency domain position indicated by the frequency domain resource information, in a transmission subframe indicated by the quantity of cycles that can be occupied.

20. The method according to claim 17, wherein the scheduling signaling further comprises a service type of the data to be transmitted by the transmitting UE, and wherein the method further comprises:
   creating, by the receiving UE, according to the service type, a radio link control (RLC) entity corresponding to the service type; and configuring, by the receiving UE, parameters of the RLC entity, according to a configuration table pre-stored in the receiving UE, and that corresponds to the service type.

* * * * *